PORTABLE BATTERY OPERABLE RECORD PLAYER

Filed Nov. 2, 1962

INVENTOR:
Max Ernst
By Walter Becker.

PORTABLE BATTERY OPERABLE RECORD PLAYER

Filed Nov. 2, 1962

INVENTOR:
Max Ernst
By Walter Becker.

Dec. 14, 1965 M. ERNST 3,223,422

PORTABLE BATTERY OPERABLE RECORD PLAYER

Filed Nov. 2, 1962 4 Sheets-Sheet 3

INVENTOR:
Max Ernst
By

Dec. 14, 1965 M. ERNST 3,223,422

PORTABLE BATTERY OPERABLE RECORD PLAYER

Filed Nov. 2, 1962 4 Sheets-Sheet 4

INVENTOR:
Max Ernst
By Walter Becker.

3,223,422

PORTABLE BATTERY OPERABLE RECORD PLAYER

Max Ernst, Lohengrinstr. 14, Nurnberg, Germany

Filed Nov. 2, 1962, Ser. No. 235,610
Claims priority, application Germany, Nov. 6, 1961, E 21,922
11 Claims. (Cl. 274—9)

The present invention relates to a record player and, more specifically, to a record player operable by a battery fed low current motor which may also be combined with a radio.

It is an object of this invention to provide a portable record player operable by a battery, which will have a low current consumption and will be of light weight.

It is another object of this invention to provide a portable record player which will be able to play in any position.

It is still another object of this invention to provide a portable record player as set forth in the preceding paragraphs, which for all practical purposes will not be sensitive to any normal shocks.

These and other objects and advantages of the invention will appear more clearly from the following specification in connection with the accompanying drawings, in which.

Figure 1:
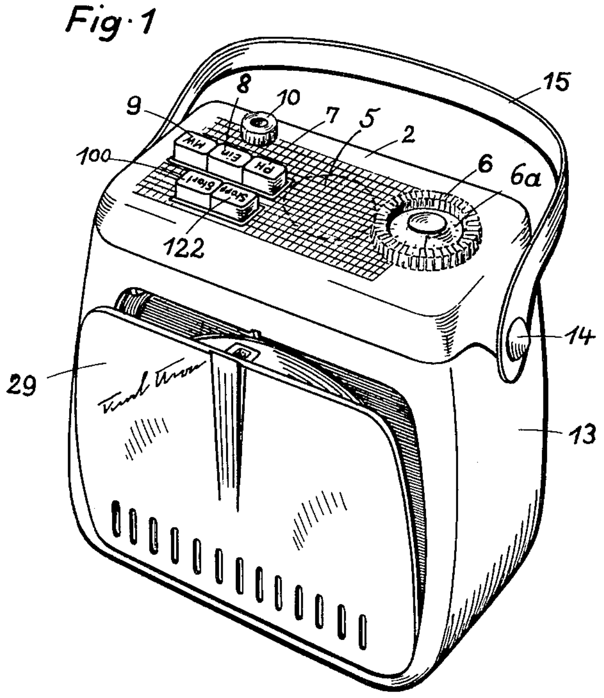
FIG. 1 illustrates a perspective view of the exterior of a record player according to the invention.

The record player according to the present invention is, in addition to other features, characterized by the fact that the turntable comprises means for clamping the respective record against the turntable while the pick-up arm carrying the pick-up head is pressed by spring force against the respective record. Furthermore, the pick-up arm is designed as a rigid two-arm light weight lever having one end thereof equipped with the pick-up head or sound head while its other end carries a balancing mass. The said two-arm lever is easily tiltably journalled at or in the neighborhood of its center of gravity and is supported by the record player in such a way that it is tiltable in the manner of a universal joint.

The record player according to the invention may be played like an ordinary portable radio in any position. Therefore, it may be placed in any convenient location, at stationary places or in vehicles, wherever it may be desirable while being non-sensitive to shocks and movements. Thus, the record player according to the present invention will operate also satisfactorily while being carried by hand or car, boat, airplane, or the like. Due to its small size and low weight it can also be easily carried in suitcases.

According to a further feature of the invention, the pick-up arm may be arranged in a protected manner in the interior of the device on an insert or mounting plate below the turntable while the sound head extends through a suitable opening in a partition. The diameter of the turntable is selected so small that the record may be played from the back side thereof.

According to a further feature of the invention, the turntable has a centering head which preferably together with the turntable is made of one piece. The centering head has holding members by means of which the record to be played is secured against accidental lifting off and turning movements and may be connected to the turntable and without additional means may be manually placed on the turntable and taken off therefrom.

According to a further feature of the invention, keys, especially starting and stopping keys, are provided for operating the record player. Another feature of the present invention consists in that after a record has been played, the device will automatically be turned off. In this instance, the pick-up arm is lifted off the record and in this lifted off position is returned to its starting position while the driving motor will be turned off and an intermediate drive will be stopped.

Due to the particular design and mounting of the pick-up arm and the possible operation by keys on the outside of the device, a simple and foolproof operation is secured during the record changing as well as the starting and stopping of the device thereby avoiding damage to the record and the pick-up arm even if the device is not carefully handled.

By means of the starting key it is possible to play a mounted record as often as desired without opening the apparatus. By means of the stopping key, the playing of a record may be interrupted at any desired time in which instance the device will each time return to its turned on position and a new record change may immediately be effected.

The batteries employed in connection with a record player according to the invention as well as a number of records are easily accessible behind the lid at the back side of the device.

Referring now to the drawings in detail, the apparatus disclosed therein comprises a multi-stage transistor amplifier with built-in ferrite aerial and permanent dynamic loudspeaker. The amplifier part 1 is arranged below the housing upper portion 2 and by means of a socket 3 and a corresponding multi-pin plug 4 (FIG. 3) may be separated from the remaining apparatus portion. The top side of the housing upper portion 2 is perforated while the loadspeaker 5 is located approximately in the center below said top side. At the top side of the upper portion 2 there is stationarily arranged a circular wave dial 6a with a knurled head 6 adjacent thereto. This head has a transparent central section and a mark for selecting the respective radio station. On the other side of the top portion approximately in the central part thereof, there are provided three pushbuttons 7, 8 and 9. Pushbutton 7 is intended for turning on the record player, while the pushbutton 8 is provided for switching over to radio reception. The phono switch and intermediate wave switch are designed as selector switches. Finally, the pushbutton 8 is provided for turning on the amplifier when pressed down once, whereas when pressed twice, it also acts as turning off switch. Below the said three pushbuttons 7, 8 and 9 there is provided a small knurled head 10 for volume control. In a cutout above the said three pushbuttons 7, 8 and 9 there are located two further pushbuttons, one starting button 100 and one stopping button 122 for the record player.

The housing upper portion 2 which is equipped with the amplifier is insertable into a lower housing part 13. The housing upper portion 2 is connected to the housing lower portion by means of two screws 14 which at the same time also connect the handle 15 to the housing. Prior to connecting the upper and lower housing portions, the multipin plug 4 is inserted into the corresponding socket 3 of the amplifier part 1.

Figure 11:
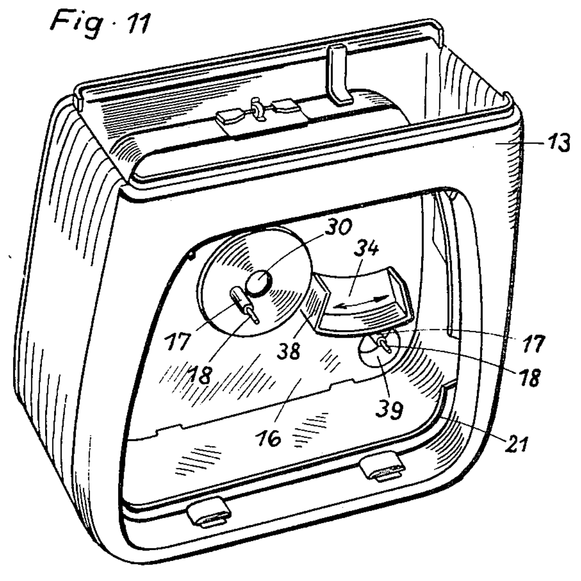
FIG. 11 is a perspective view of the lower portion of the housing as seen from the rear.
Figures 12, 13:
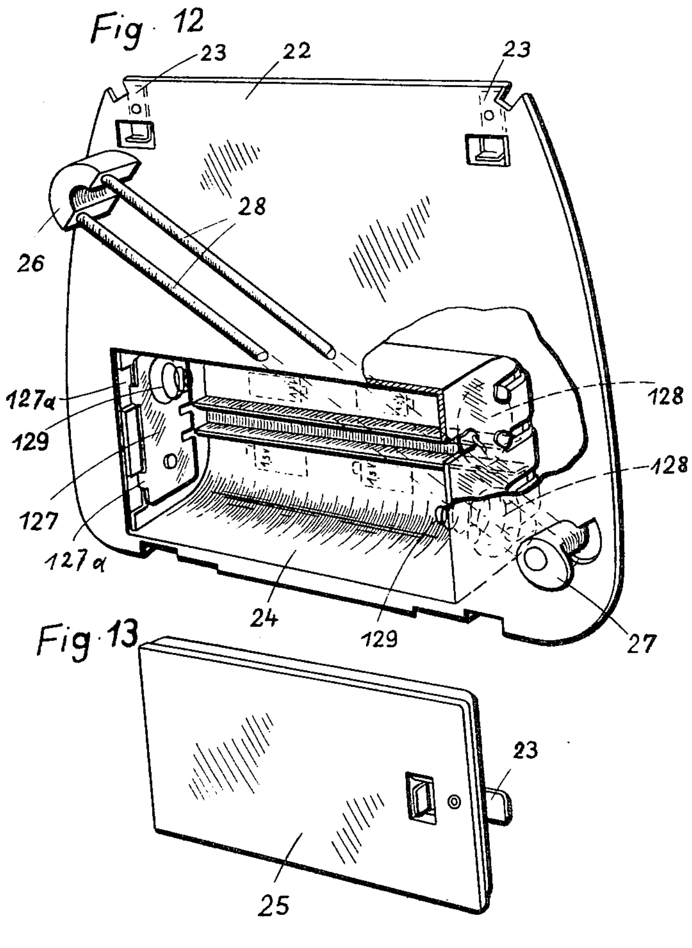
FIG. 12 is a perspective view of the rearward partition with the battery container and the device for storing the records.
FIG. 13 shows a closure member for the battery container.

The housing lower portion is similar to the housing upper portion made of injection molding material and consists of two individually made parts which are fused together and covered at the fusing seam (FIG. 11). One part has a recessed partition 16 at the bottom side of which there are provided three inwardly extending protrusions 17 into which are injected metallic connecting pins 18. Connected to these three metallic pins by means of rubber plugs 20 and clamping discs (FIG. 3) is an insert in the form of a plane plate 19. On the oppositely located side of the housing lower portion, somewhat offset toward the front there is provided a narrow rim 21 which may be integral with said housing portion. In this rim portion 21 there is detachably inserted a second partition 22 (FIG. 12) which may likewise be of synthetic material. This partition 22 may be connected to the rim portion 21 by means of pins (not shown) and latches 23. This second partition 22 is provided with a trough-shaped depression 24 which serves for receiving the battery. This depression is closed by a lid 25 by means of a tongue and latch 23.

Connected to the two end faces of the trough-shaped depression 24 by means of tongues **127*a* are a metal bridge 127 and metal contacts 128. Springs 129 assure a proper current transfer from the batteries to the current feeding lines (not shown) connected to the two contacts 128. Mounted on said two partitions 22 are two protrusions 26, 27 which are interconnected by a loop 28 formed by a rubber band. Records may be stored behind said rubber band 28. The storage chamber for the records may be closed by a housing lid (not shown) adapted to be folded against the housing lower portion. A similar housing lid 29** is provided on the opposite side for closing the chamber in which the respective record being played is arranged (FIG. 1).

The front partition 16 which is integral with the housing has approximately in the central portion thereof a circular opening 30 for the shaft of the turntable. In addition thereto partition 16 is provided with an annular depression 32 for receiving the turntable 33 which has a rather small diameter. Adjacent to depression 32 there is provided a segmental cutout 34 for the passage of the soundhead 35. This cutout is on those three sides which are not swept by the pick-up arm 36 provided with an inwardly protruding rim 38. In the front partition 16 there is provided a cylindrical opening 39 in which a driving roller 40, 41 is rotated.

The mounting plate 19 has arranged thereon all movable parts for the playing of the records and is mounted on the inside of the partition 16 by means of three pins 18. On that side of the partition 16 which faces the mounting plate 19, there is connected a bearing bushing 31 for receiving the bearing stud 42 of the turntable. This bearing bushing 31 is concentrically arranged with regard to the above mentioned central opening 30 in partition 16. A precise location as to height of the turntable may be obtained by the insertion of washers **30*a*. The turntable is secured against accidental dropping out by a notch in the rear portion of the bearing stud 42 and by a spring disc 42*a*. The bearing stud 42 extends slightly toward the rear beyond the mounting plate 19 and comprises a turn off member 43** in the form of a coiled spring wire.

The turntable (FIG. 4) comprises the following elements: The annular disc-shaped turntable 33 proper with the centering head 44. This centering head is approximately conically designed and has a cylindrical portion where it merges with the turntable. The centering head has three cutouts 45. Within the hollow centering head there is provided a member 46 (see FIG. 6) of spring metal, which member 46 is pressed into the centering head by means of short tongues 47. Three longer tongues 48 protrude outwardly beyond the cutouts 45 of the centering head 44 and are outwardly bent so that they spring outwardly. These three tongues 48 will when mounting the record 69 yield inwardly and will when the record is properly located on the turntable spring outwardly and thus clamp the record against the turntable. The record will in this way be secured against accidential movement away from the turntable and also against accidental turning movements. Turntable and centering head are made of one piece, preferably of synthetic material. The bottom side of the hollow centering head 44 is covered by a disc 50 glued to the centering head and provided with cutouts 49. The resilient tongues 48 are biased and if no record is on the turntable, rest by means of their lower end in the cutouts 49 of disc 50 on the inner rim portion of the turntable. The bearing stud 42 which is preferably made of steel may at the time of the injection molding of the turntable be injected into the extension **44*a* within the head 44**.

Figure 2:
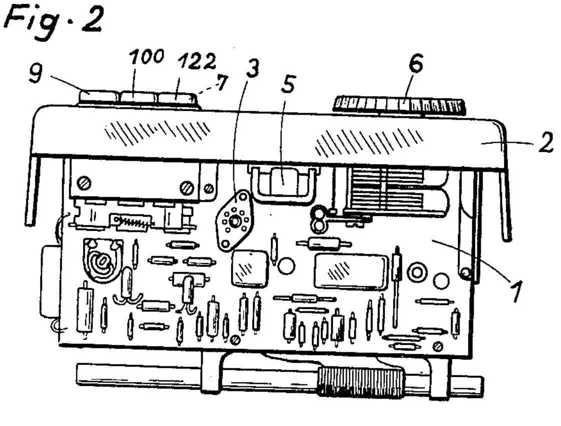
FIG. 2 is a side view of the upper portion of the housing containing the record player and also shows the amplifier stage, a ferrite aerial and a loudspeaker.

The drive of the record is effected in a manner known per se through the intervention of a rubber roller 40′ (FIG. 7) pressed against the outer rim of the record. The mounting plate 19 is provided with a speed variable low current motor 51. Motor 51 is held between two semi-cylindrical bowls 52 and 53 with thin rubber rings 54 interposed therebetween. The two bowls 52 and 53 are held together by means of tongues 57 and screws 56, and by means of tongues 57 and 58 are connected to the mounting plate 19. For purposes of driving the record, there is provided the upwardly protruding shaft 59 of motor 51. The semi-circular bowl 53 has a rearwardly extending web 60 with a bearing eye parallel to the mounting plate 19. The non-rotatable bearing shaft 62 of an intermediate drive is journalled in the bearing eye 61. The lower end of this shaft 62 is provided with a notch engaged by a spring disc 63. Between spring disc 63 and bearing eye 61 there are provided washers 64 of synthetic material. In an intermediate notch of shaft 62 there is provided a spring disc 65. Between bearing eye 61 and spring disc 65 there is located a pressure spring 66. In this way shaft 62 is connected to the bearing eye 61 in the manner of a ball joint and is tiltable in every direction while it is adapted to yield in rearward direction. Shaft 62 extends in the housing forwardly beyond the partition 16 and is located within a relatively wide opening 67 in the mounting plate 19. By means of a spring 68 engaging shaft 62, the intermediate motor 40, 41 has its part 41 pressed against the drive shaft 59 of motor 51 while part 40 presses against the rim of the record 69. Connected to the forwardly protruding end of bearing stud 62 is the intermediate drive (FIG. 2) having its outer portion made of rubber and being secured by means of a spring disc. As will be evident from FIG. 7, this intermediate drive comprises a brass bushing 70, a member 71 surrounding bushing 70 and consisting of a heavy metal, as for instance lead, and the two rubber rollers 40′, 41′ arranged in spaced relationship to each other. The lower relatively flat rubber roller 41′ frictionally engages shaft 59 of motor 51, whereas the upper somewhat higher rubber roller 40′ frictionally engages the rim of the record 69. The intermediate drive 40, 41 thus serves as flywheel mass. The two rubber rollers 40', 41' which are located one behind the other have the same diameter.

The bearing shaft 62 of the intermediate drive 40, 41 is so located with regard to the axis of rotation of shaft 42 of the turntable 33 and the axis of rotation of shaft 59 of the low current motor 51, that the connecting line between the axis of the turntable shaft 42 and the axis of shaft 62 of the intermediate drive is located approximately at a right angle with regard to the connecting line between the axis of said shaft 62 and the axis of motor 59. The direction of pull of a spring 68 engaging shaft 62 is located approximately in the direction of the line bi-secting the said approximate 90° angle. The distance between the rim of the record 69 and the axis of motor shaft 59 is less than the diameter of the two rubber rolls 40' and 41' so that in view of the pull exerted by spring 68, the intermediate drive will cause rubber roll 40' to engage the marginal portion of the record and will cause rubber roll 41' with approximately the same force, to engage shaft 59 of motor 51.

Figures 3, 4, 5, 6, 7:
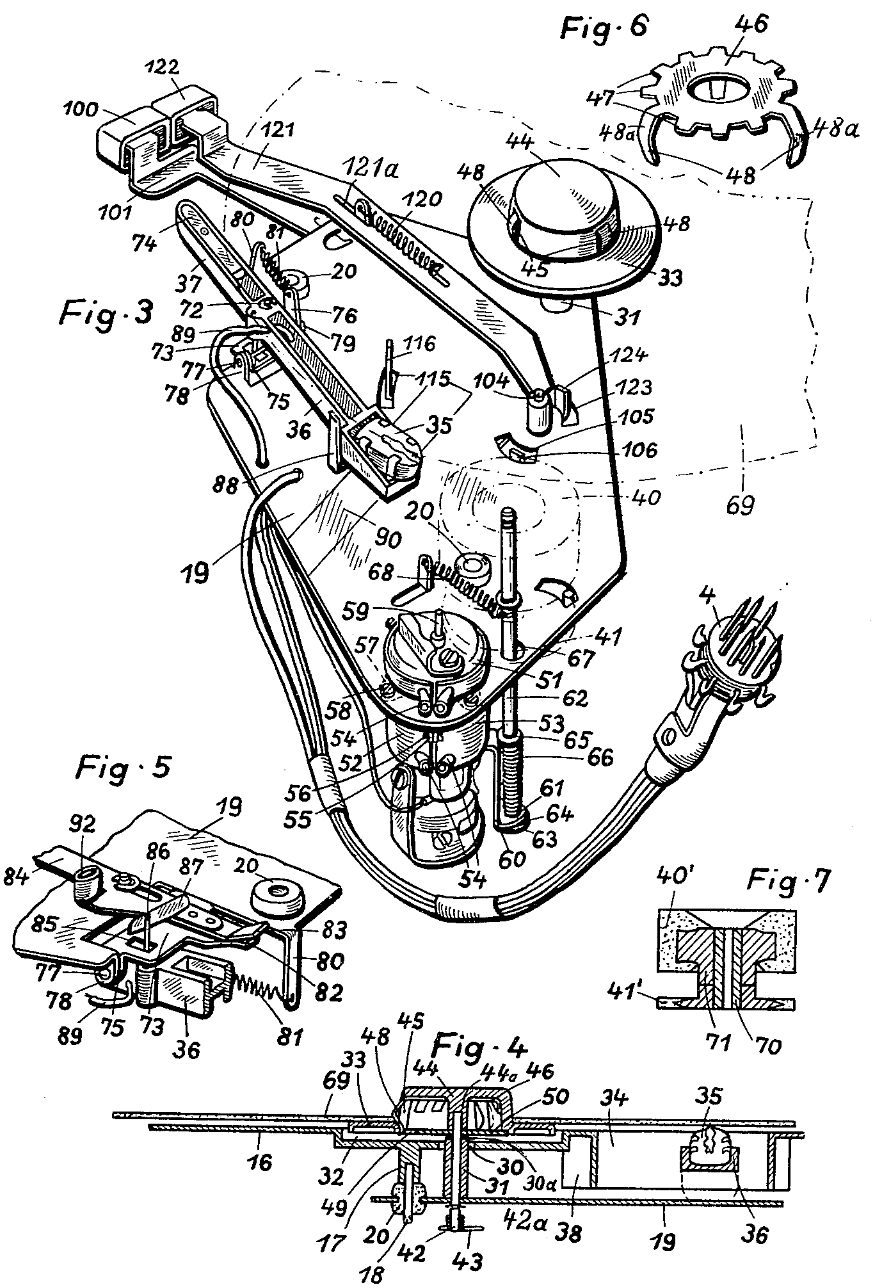
FIG. 3 illustrates a perspective view of the mounting plate with all movable parts pertaining to the record player.
FIG. 4 is a longitudinal section through the turntable with a corresponding portion of the housing.
FIG. 5 is a perspective view of the mounting for the pick-up arm as seen from below with regard to FIG. 3.
FIG. 6 is a perspective view of the spring member in the centering head of the turntable.
FIG. 7 is a longitudinal section through an intermediate drive for turning the record.

That side of the mounting plate 19 which faces the front partition 16 carries the pick-up arm 36, 37 (FIG. 3). The arm 36, 37 is a two-arm rigid lever and is easily turnable about a shaft 72 and journalled on a support 73, said shaft 72 being substantially perpendicular to the mounting plate 19. The rear lever arm 37 is provided with metal parts 74 riveted thereto so that the center of gravity of arm 73 is located in its axis of rotation. The soundhead 35 is exchangeably connected to the pick-up arm 36, 37. The support 73 for the pick-up arm has two ears 75, 76 and by means of a bearing stud 77 is tiltably journalled on correspondingly angled ears 78, 79 of the mounting plate 19 so that support 73 is tiltable about stud 77. The ear 76 of support 73 is perpendicular to the mounting plate and extends upwardly toward the front. The ear 76 is engaged by a spring 81 the other arm of which is connected to an arm 80 of the mounting plate 19. The sound-head 35 is thus by said spring 81 pressed against the record 69. Furthermore, the support 73 has an extension 82 (FIG. 5) which extends rearwardly at an incline. This extension 82 is engaged by the end 83 of a control rod 84 which end is likewise angled off toward the rear. When said control rod is moved in longitudinal direction thereof, it lifts the support 73 upwardly and thereby lifts the sound-head 35 off the record against the thrust of spring 81.

The support 73 is provided with rectangular cut-outs 85 through which extends a pin 86 up to the back side of the mounting plate 19. This pin 86 is arranged on the pick-up arm 36, 37 in slightly spaced relationship to the pivot shaft 72. For purposes of moving the pick-up arm into its ineffective position, said pick-up arm is by means of a leaf spring 87 riveted to control rod 84 and by said pin 86 returned to its starting position. This ineffective or starting position is determined by an abutment 88 at the front side of the mounting plate 19. An insulated wire or cable 89 connects the amplifier to the sound-head near shaft 72 of the sound-head. Leaf spring 87 on control rod 84 is with regard to the two ears 82, 83 arranged on the sound-head 73 and control rod 84 in such a way that when returning the pick-up arm to the ineffective position, said arm is first lifted by the ear 83 and then by the members 86, 87 moved against the abutment 88. Inasmuch as during this operation, the back side of arm 36 engages the mounting plate 19 and in this position is moved against the abutment 88, the pick-up arm and the mounting plate must at their point of contact be particularly smooth. To this end, a cellophane tape 90 is stuck to the mounting plate.

Figures 8, 9, 10:
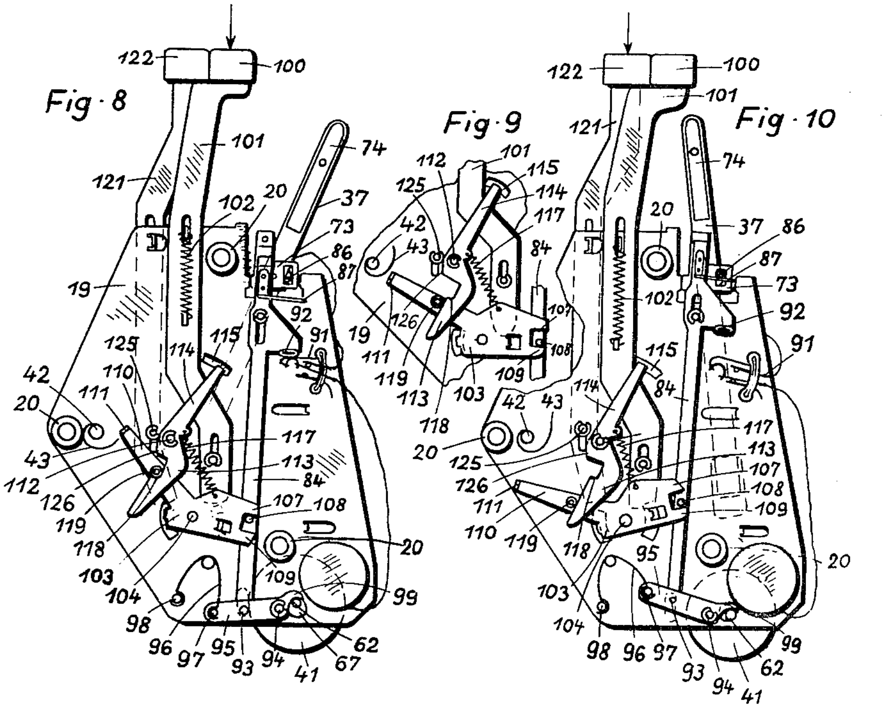
FIG. 8 illustrates the starting and stopping keys and the mechanism actuated thereby for controlling the starting and stopping of the record player, FIG. 8 illustrating the arrangement shortly before the release of the stopping mechanism by the pick-up arm.
FIG. 9 illustrates a portion of FIG. 8 in a position following the release of the turn off mechanism by the pick-up arm but prior to the turn off by the stopping of the turntable.
FIG. 10 illustrates the same view as FIG. 8 but in the turned off position.

As will be evident from FIGS. 8 to 10, a micro-switch 91 is mounted on the back side of the mounting plate 19. This micro-switch 91 which is designed as a double-throw switch, is intended for the drive motor which latter, by means of an abutment 92 provided on control rod 84, is switched on and off, depending on the position of the control rod.

The record player according to the invention is furthermore provided with means by which, simultaneously with the lifting off and returning of the pick-up arm to its ineffective position and with the switching on and off of the low current motor, the intermediate drive designed as rubber roll will respectively be lifted off and engaged with the marginal portion of the record and the motor. Control rod 84 which brings about the movement of the pick-up arm into effective and ineffective position and also brings about the switching on and switching off of the low current motor, has its lower end pivotally connected to a lever 95 by means of a pivot 93. Lever 95 is tiltable about a pivot 94 connected to the mounting plate 19. Between pivot 97 arranged at the end of lever 95 and pivot 98 on mounting plate 19, there is provided a pressure spring 96 formed by a yoke-shaped wire. This spring 96 brings about that lever 95 and control rod 84 pivotally connected to said lever 95 are adapted to be tilted from one stable end position into a second stable end position and vice versa (FIGS. 8 and 10). Lever 95 has a hook-shaped arm 99 which releases the shaft 52 of the intermediate position when lever 95 and control rod 84 are in their turning-on position. This second arm 99 will, when lever 95 and control rod 84 are in turned-on position, release the shaft 62 of the intermediate drive. Said arm 99 will furthermore, when occupying its turning-off position, lift off said shaft 62 from the marginal portion of the record and the motor shaft.

For turning on the record-player, there is provided a push button 100 located on the housing upper portion 2. This push button 100 is arranged in a cutout in front of the push buttons 7, 8 and 9 for the amplifier. The push button 100 is connected to the end of a long key shank 101 which is displaceable by means of pivots and oblong holes against the thrust of a spring 102 arranged on the back side of the mounting plate 19. The back side of mounting plate 19 also carries a switch lever 103 which is easily tiltable about a pivot 104. This lever 103 has a tongue 106 which extends through a slot 105 in the mounting plate 19. The said tongue 106 is engaged by the lower end of key shank 101 (FIG. 3). A control finger 107 forming part of the control lever 103 engages by means of a somewhat larger lever arm a stud 108 on control rod 84 so that when depressing push button 100, the control rod 84 will through the intervention of lever 103 be moved out of its FIG. 10 position, which represents the turned-off position, into its FIG. 8 position, which represents the turned-on position.

As has been mentioned above, the apparatus is provided with a device for stopping the mechanism after a record has been played. To this end, control lever 103 is provided with a second control finger 109 by means of which, through the intervention of a stud 108 on control rod 84, the control rod may again return to its turned-off position. To this end, as mentioned above, the rear end of shaft 42 of the turntable is provided with a spirally wound spring member 43. Control lever 103 has a lever arm 110 with a tongue 111 extending toward the rear. In addition thereto, means are provided by which, following the playing of a record, arm 110 of control lever 103 is moved into the neighborhood of spring member 43 in such a way that said spring member 43 engages tongue 111 thereby causing control finger 109 of control lever 103 to move control rod 84 into its turned-off position. For purposes of initiating this operation, the back side of the mounting plate has a release lever 113 which is pivotally journalled on a pivot 112. Said release lever 113 has a lever arm 114 with a tongue 116 extending through a slot 115 in mounting plate 19. Following the playing of a record, the pick-up arm 36, 37 moves into the range of movement of tongue 116 whereby a spring 117 connected to levers 103 and 113 will move lever arms 114 and 107 toward each other. Furthermore, levers 113, 114 has a step 118 which is engaged by a stud 119 when the record player is turned on. Stud 119 is preferably provided with a roller and is mounted on the lever 103. When lever 103 occupies this position, tongue 111 has been tilted beyond the range of movement of spring member 43 so that lever 103 can no longer be actuated by the spring member 43. Spring 117 is a relatively weak spring.

According to the embodiment shown in the drawing, lever 103 and also levers 113, 114 are provided with ears into which spring 117 is suspended. When actuating levers 113, 114 by the pick-up arm, first lever 103 is unlocked. Lever 103 will then, by spring 117, be moved into the FIG. 9 position in which control finger 109 engages from below the stud 108 of control rod 84 without, however, control rod 84 being actuated. Tongue 111 of lever arm 110 will then be located within the range of spring member 43 so that at the next following rotation of the turntable, control rod 84 will, by lever 103, be moved into the turned-off position according to FIG. 10. Spring member 43 merely has to overcome the dead-center position of lever 95. The remaining turning-off stroke will be effected by spring 96.

In order to be able, at random, manually to turn off the record-player, a second key shank 121 is provided on the front side of the mounting plate 19. This shank 121 is displaceable in guiding means 121*a* against the thrust of a spring 120. The upper end of shank 121 has a stop button 122 located in a cutout of the housing upper portion 2, preferably adjacent the starter button 100. The lower end of shank 121 engages a tongue 124 extending through a slot 123 in mounting plate 19 and forming part of lever 103. Inasmuch as lever 103, as shown in FIG. 8, is locked in its turned-on position by lever 113, shank 121 is additionally provided with a stud 125 which extends through a slot in the mounting plate 19 toward the rear. This stud 125 is adapted by means of a control edge 126 on lever 113 to unlock control lever 103 so that subsequently, through the intervention of shank 121 and lever 103, control rod 84 may be moved into its turned-off position.

It is, of course, to be understood that the present invention is, by no means, limited to the particular construction shown in the drawings, but also comprises any modifications within the scope of the appended claims.

What I claim is:

1. In a portable record player: mounting plate means, a turntable having a surface for receiving a record, clamping means for clamping a record on said turntable, means rotatably supporting said turntable on said mounting plate, a two-arm pick-up lever, universal joint means supporting said pick-up arm on said mounting plate means so that said pick-up lever is tiltable in various planes, said pick-up lever being moveable from a radially outer starting position on a record on said turntable inwardly to a radially inner end portion, a sound-head on one arm of said pick-up lever for engagement with a record on said turntable, balancing means so mounted on the other arm of said pick-up lever as to bring the center of gravity of the pick-up lever assembly into the immediate region of said universal joint means, spring means continuously urging the pick-up lever in the direction to move said sound head toward said turntable, first elements of abutment means on said pick-up lever and on said universal joint means, a motor switch on said mounting plate means, a control rod slidably mounted on said mounting plate means, a member on said control rod operable for closing and opening in the said motor switch in first and second end positions respectively of said control rod, second elements of abutment means on said control rod adapted to engage the said first elements of abutment means in said second position of the control rod and adapted to lift said pick-up lever from said turntable and to return the same to its starting position, a bi-stable control member connected to said control rod and adapted releasably to hold the latter in its respective end positions, manual means including spring biased pushbutton means operable to move said control rod into its said first end position, and means operatively connected to said control rod and engageable by said pick-up lever when said pick-up lever reaches its said radially inner end position and adapted when so engaged to move said control rod into its said second end position.

2. A portable record player according to claim 1, in which said universal joint means includes auxiliary plate means tiltably mounted on said mounting plate means on a first axis and pivotally supporting said pick-up lever on a second axis perpendicular to said first axis, said first elements of abutment means including an extension on said auxiliary plate means and a pin on said pick-up lever, said second elements of abutment means including an extension and a resilient abutment on said control rod, said extension on said control rod being located within the range of movement of said extension on said auxiliary plate means and said resilient abutment on said control rod being located in the range of movement of said pin on said pick-up lever, said resilient abutment being offset with regard to said extension on the control rod so that during the movement of the control rod into its said second end position the said extension thereon engages the extension on the auxiliary plate means and the said extensions become effective before the resilient abutment engages said pin so that the pick-up lever is first lifted off the turntable and is thereafter moved into its radially outer or starting position.

3. A portable record player according to claim 2 in which the mounting plate means is provided with a smooth surface which the pick-up lever engages following the lifting thereof and on which the pick-up lever rests during the movement thereof into its starting position.

4. A portable record player according to claim 2 in which said motor switch is a mono-stable normally open toggle switch and is held in its closed position by said member on said control rod when the control rod is in its said first end position.

5. A portable record player according to claim 2 in which said bi-stable control member includes a control lever pivoted to said support plate means, a pressure spring having one end engaging one end of said control lever and another end connected to said mounting plate means, said control rod being pivotally connected to said control lever.

6. A portable record player according to claim 2 which includes an electric motor mounted on said mounting plate means, and a selectively engageable intermediate drive for establishing a driving connection between the motor shaft and the rim of a record on said turntable, and means operated by said control rod upon movement thereof into its said first end position for effecting engagement of said intermediate drive.

7. A portable record player according to claim 6 in which said intermediate drive includes a laterally moveable shaft and means on said control lever for moving said shaft laterally into effecting driving position.

8. A portable record player according to claim 1 in which said manual means includes a bar portion slidable on said mounting plate means and having said pushbutton means on one end thereof, an actuating lever pivoted on said mounting plate means near the other end of said bar portion, a finger on said actuating lever abutting said control rod for moving it toward its said first end position, and means on the actuating lever for abutment by said bar portion of said manual means to actuate the actuating lever in a direction to bring said finger into actuating engagement with said control rod.

9. A portable record player according to claim 8 in which said actuating lever has a second finger for engagement with said control rod to move the control rod toward its second end position, a spring cam driven by the turntable for actuating said actuating lever in a direction to move said control rod toward its said second end position, and means operated by the pick-up lever when it reaches its inner end position for moving said actuating lever into the range of said spring cam to cause the spring cam to move the actuating lever in a direction to move said control rod into its said second end position.

10. A portable record player according to claim 9, in which said means operated by the pick-up lever includes a trip lever releasably latching said actuating lever out of the range of said spring cam and engageable by the pick-up lever to release said actuating lever for movement into the range of said spring cam, and a spring acting between said actuating lever and said trip lever.

11. A portable record player according to claim 10, which includes second manually operable means comprising a second pushbutton and a bar element actuated thereby and including first means to disengage said trip lever from said actuating lever and second means to abut said actuating lever and move the same in a direction to shift said control rod toward its said second end position, said first and second means being located on said bar element and being sequentially operable during actuation of said second pushbutton.

References Cited by the Examiner

UNITED STATES PATENTS

| | | | |
|---|---|---|---|
| 2,293,212 | 8/1942 | Offen | 274—10 |
| 2,310,229 | 2/1943 | Gay | 274—9 |
| 2,318,183 | 5/1943 | Roberts | 274—9 |
| 2,576,250 | 11/1951 | Brubaker | 274—9 |
| 2,622,883 | 12/1952 | Kurzen | 274—9 |
| 2,626,158 | 1/1953 | Lissance | 274—13 |
| 2,898,117 | 8/1959 | Vistain | 274—10 |
| 2,939,713 | 6/1960 | Winter | 274—9 |
| 2,977,124 | 3/1961 | Staar | 274—9 |
| 2,988,365 | 6/1961 | Favaro | 274—9 |
| 3,111,323 | 11/1963 | Zimmermann | 274—9 |

NORTON ANSHER, *Primary Examiner.*

LEO SMILOW, *Examiner.*